United States Patent [19]

Okamoto et al.

[11] Patent Number: 5,521,349
[45] Date of Patent: May 28, 1996

[54] PROJECTION WELDING METHOD

[75] Inventors: Kenjiro Okamoto, Kumano-gun; Kuniyasu Iwazaki; Kihachiro Ohta, both of Naka-gun, all of Japan

[73] Assignee: Nippon Corporation, Kyoto, Japan

[21] Appl. No.: 223,868

[22] Filed: Apr. 6, 1994

[30] Foreign Application Priority Data

Apr. 12, 1993 [JP] Japan ..................... 5-084409
Apr. 14, 1993 [JP] Japan ..................... 5-087450

[51] Int. Cl.⁶ ............................... B23K 11/14
[52] U.S. Cl. ............................... 219/93
[58] Field of Search ................... 219/93, 117.1; 29/596; 310/42, 67 R; 360/97.01, 135

[56] References Cited

U.S. PATENT DOCUMENTS

| | | | |
|---|---|---|---|
| 1,822,197 | 9/1931 | Bowlus | ..................... 219/93 |
| 2,625,450 | 1/1953 | Ringsmith . | |
| 4,181,867 | 1/1980 | Muller | ..................... 310/156 |
| 4,349,957 | 9/1982 | Lundin | ..................... 29/596 |
| 4,382,172 | 5/1983 | Takasugi et al. | ..................... 219/137 R |
| 4,779,165 | 10/1988 | Elsaesser et al. . | |
| 4,922,406 | 5/1990 | Schuh . | |
| 4,980,587 | 12/1990 | Yonei et al. . | |
| 4,996,613 | 2/1991 | Hishida . | |
| 5,047,677 | 9/1991 | Mineta et al. . | |
| 5,160,866 | 11/1992 | Hishida et al. . | |
| 5,168,142 | 12/1992 | Gartner et al. | ..................... 219/121.64 |
| 5,227,686 | 7/1993 | Ogawa . | |

FOREIGN PATENT DOCUMENTS

| | | | |
|---|---|---|---|
| 3113754 | 7/1982 | Germany | ..................... 219/93 |
| 2-34285 | 2/1990 | Japan . | |
| 2280975 | 11/1990 | Japan . | |
| 5184124 | 7/1993 | Japan | ..................... 310/42 |

OTHER PUBLICATIONS

"Projecting Welding and Power Consumption", P. W. Fassler, The Welding Journal, pp. 14–16, Nov. 1934.

*Primary Examiner*—Teresa J. Walberg
*Assistant Examiner*—J. Pelham
*Attorney, Agent, or Firm*—McCormick, Paulding & Huber

[57] ABSTRACT

A projection welding method which comprises providing in either one of a first member and a second member to be welded a plurality of projections projecting toward the other member, supplying a current between the first and second members to melt the plurality of projections, and welding the first and second members. The plurality of projections are composed of projections having a plurality of kinds with different heights. Furthermore, with reference to the plurality of projections, concave grooves in which a molten product flows are provided.

13 Claims, 14 Drawing Sheets

Fig.3-A
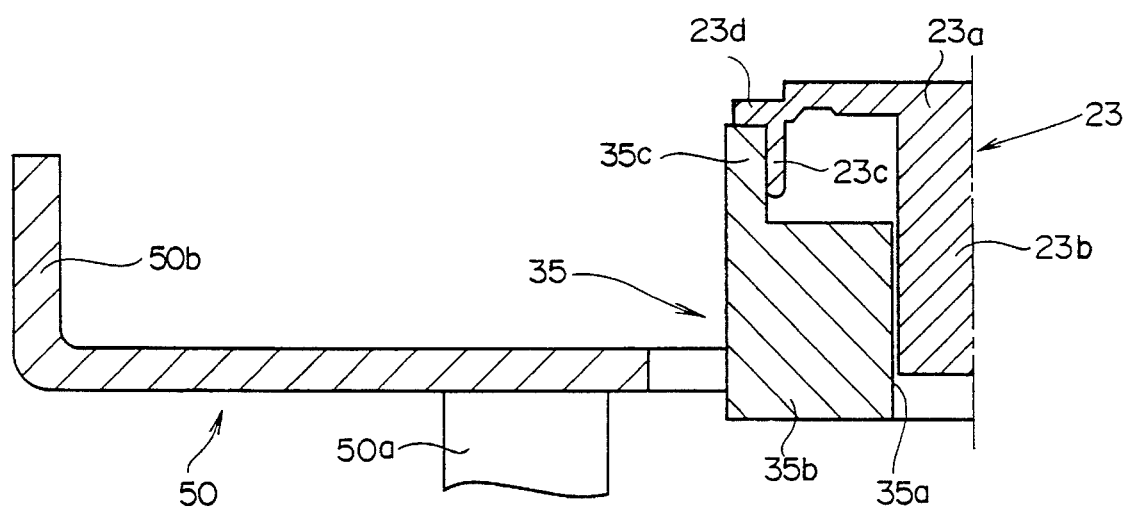

Fig.3-B
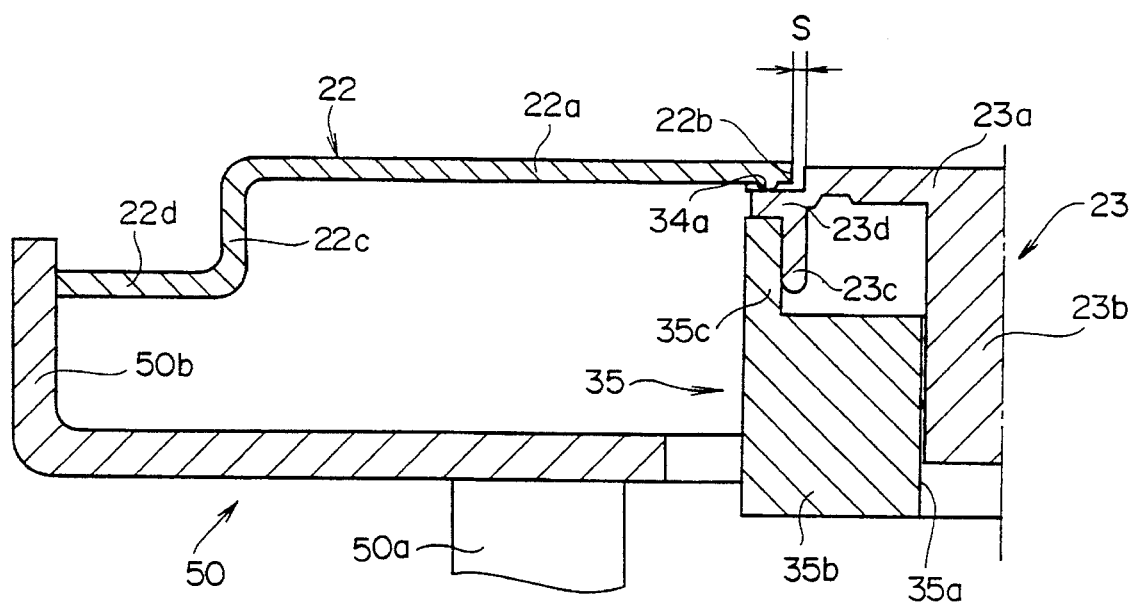

Fig. 3-C
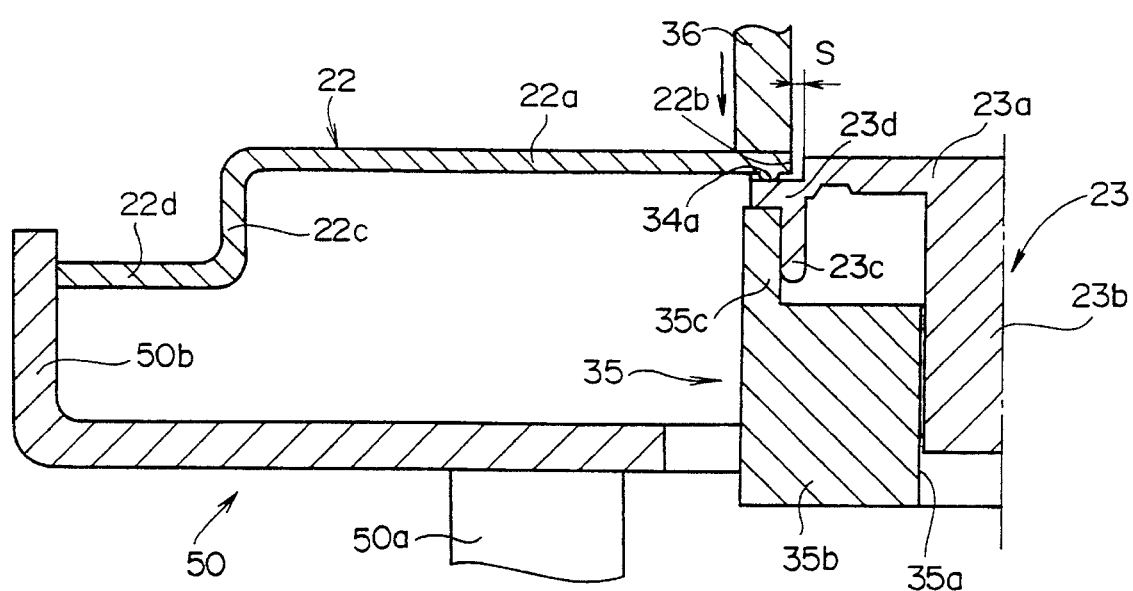

Fig. 3-D
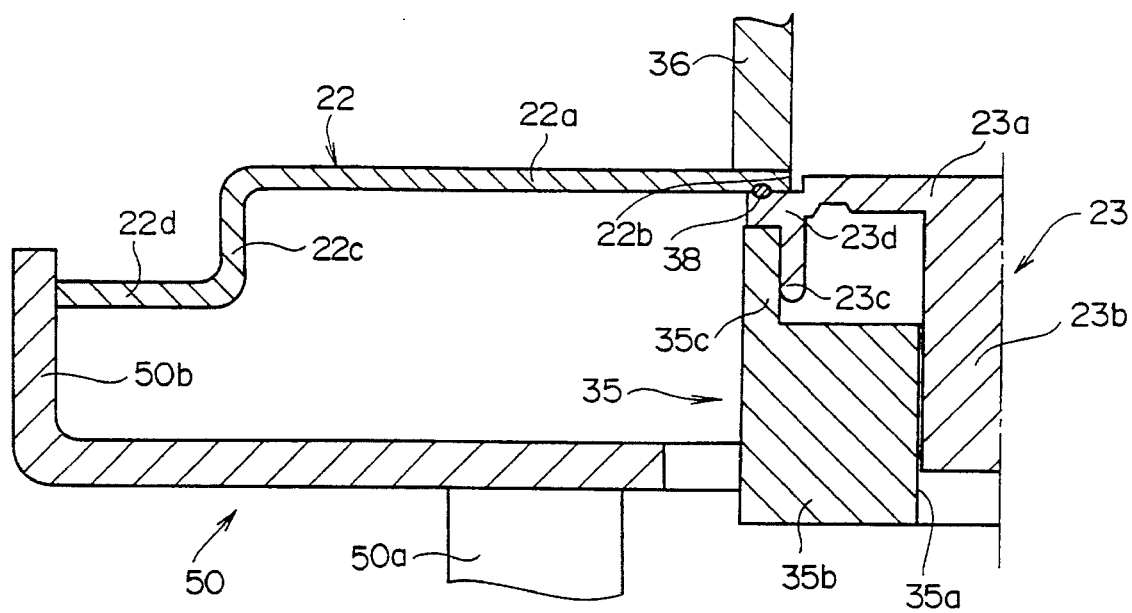

Fig.8-A
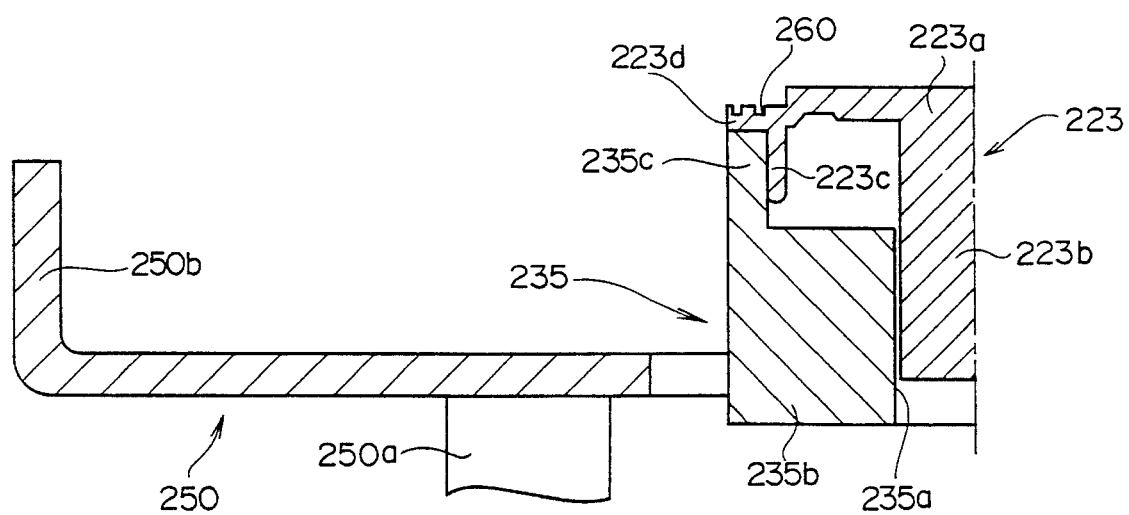

Fig. 8-B
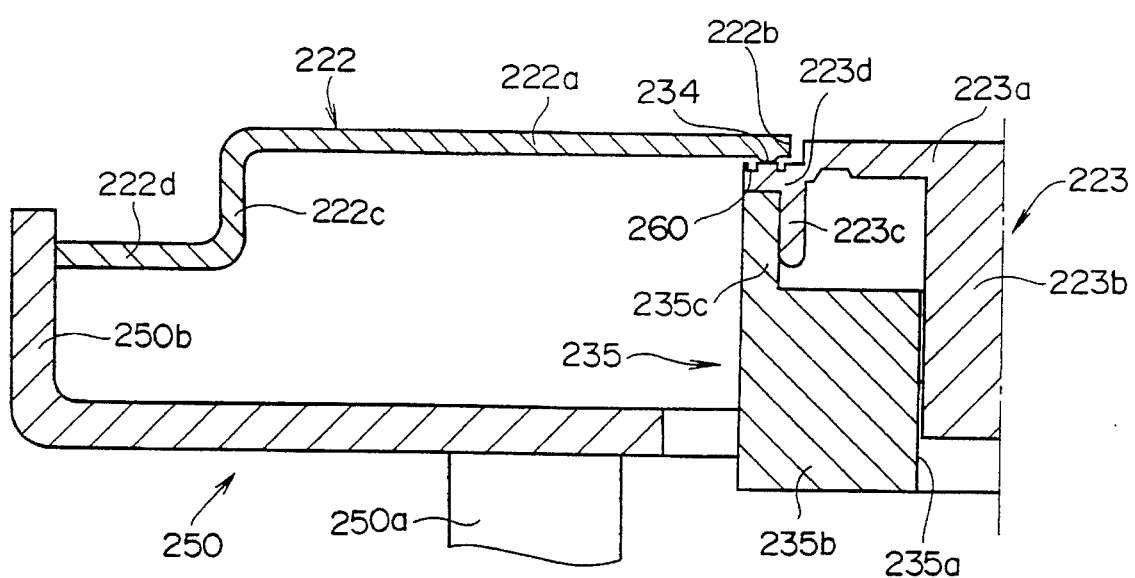

Fig. 8-C
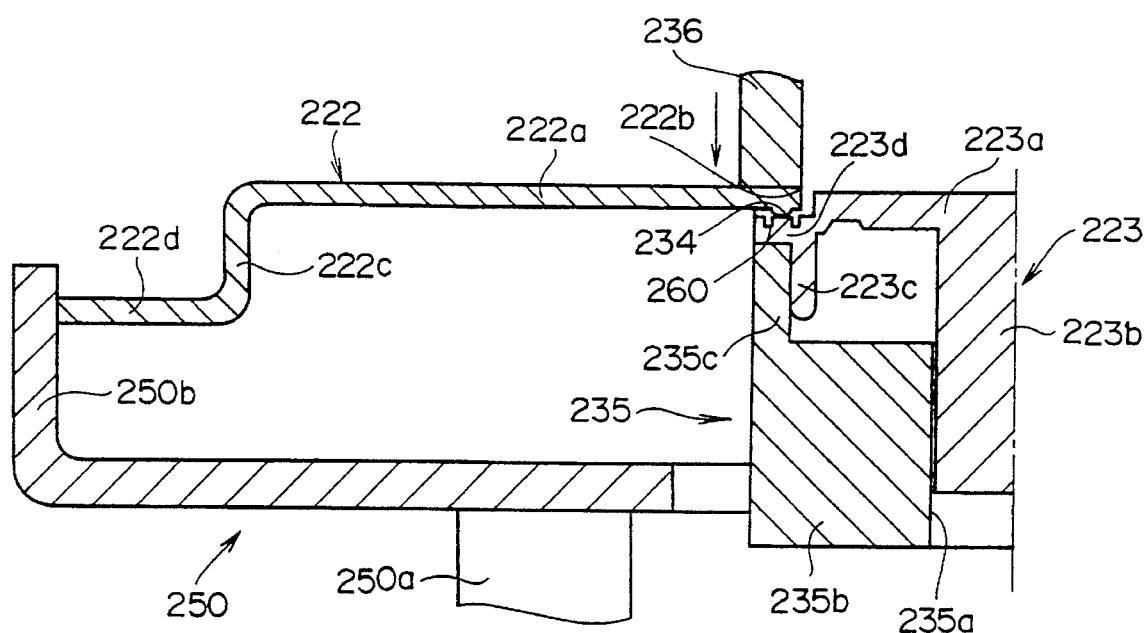

Fig. 8-D
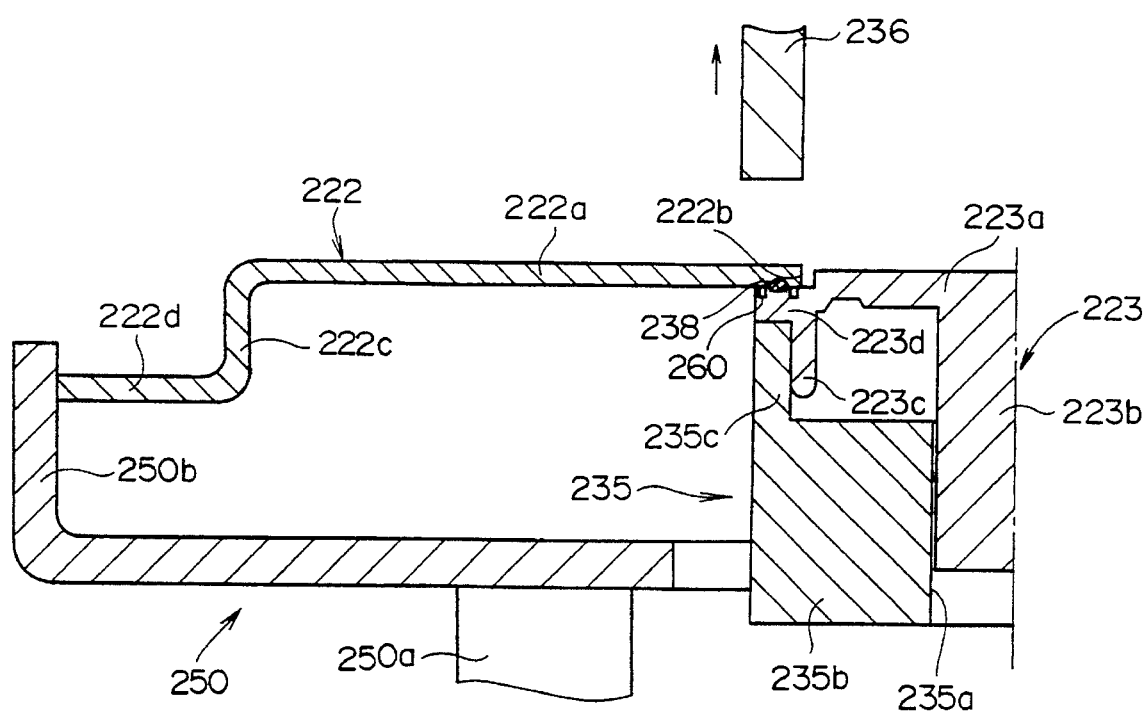

5,521,349

PROJECTION WELDING METHOD

FIELD OF THE INVENTION

This invention relates to an improvement in a method of projection welding.

DESCRIPTION OF THE PRIOR ART

Spindle motors have been widely known heretofore as motors for rotating and driving recording disks such as a magnetic disk. Spindle motors of this type are provided with a bracket mounted on a base member of a disk driving apparatus, a rotor hub rotatable relatively with respect to the bracket, a rotor magnet mounted on the rotor hub and a stator disposed in opposition to the rotor magnet. A shaft-fixed motor has a shaft fixed to the bracket, and the rotor hub rotatably supported on the shaft via bearing means. On the other hand, in a shaft-rotating motor, an annular supporting member is provided in the bracket, and the shaft provided in the rotor hub is rotatably supported on this annular member via bearing means.

In such a spindle motor, the motor itself is required to be small and thin because recently a personal computer carried, for example, on a disk driving apparatus has become small and thin. Generally, the shape of the bracket is complex in the spindle motor, and when the motor is made small in size, it becomes difficult to integrate the bracket. For this reason, in the shaft-fixed motor, the bracket and the shaft are formed separately from each other, and are fixed by insertion under pressure and/or by means of an adhesive. Furthermore, in the shaft-rotating motor, the bracket and the supporting annular wall portion are formed separately from each other, and are fixed by insertion under pressure and/or by means of an adhesive.

However, when the motor has become even smaller and thinner, the thickness of the bracket becomes very thin and accordingly, the contact area of the bracket and the shaft or the annular supporting member very small. Therefore, it becomes difficult to fix them firmly. Such a problem exists in fixing the bracket of the spindle motor to the base member of the disk driving apparatus.

Furthermore, with the smaller size of the motor, the rotor hub is constructed of a hub portion on which a magnetic disk is mounted and a rotor portion on which a rotor magnet is mounted, and the hub portion and the rotor portion are fixed by an adhesive or caulking. An improvement for fixing both of them more easily and surely has been desired.

SUMMARY OF THE INVENTION

It is a main object of this invention to provide a method of projection welding which can fix a first member to a second member by melting welding projections.

It is a second object of this invention to provide a method of projection welding which can inhibit adverse effects of a molten material which at the time of welding.

It is a another object of this invention to provide a method of projection welding which is convenient for welding constructive parts of a spindle motor.

The other objects and characteristics of this invention will be easily understood from the following description.

BRIEF DESCRIPTION OF THE DRAWINGS

FIG. 3A is an explanatory view showing steps of the manner of welding the bracket main body and a shaft in the spindle motor of FIG. 1;

FIG. 3B is an explanatory view showing steps of the manner of welding the bracket main body and a shaft in the spindle motor of FIG. 1;

FIG. 3C is an explanatory view showing steps of the manner of welding the bracket main body and a shaft in the spindle motor of FIG. 1;

FIG. 3D is an explanatory view showing steps of the manner of welding the bracket main body and a shaft in the spindle motor of FIG. 1;

FIGS. 8A is an explanatory view showing steps of the manner of welding the bracket main body of FIG. 6 and the shaft of FIG. 7;

FIG. 8B is an explanatory view showing steps of the manner of welding the bracket main body of FIG. 6 and the shaft of FIG. 7;

FIG. 8C is an explanatory view showing steps of the manner of welding the bracket main body of FIG. 6 and the shaft of FIG. 7;

FIG. 8D is an explanatory view showing steps of the manner of welding the bracket main body of FIG. 6 and the shaft of FIG. 7;

DETAILED DESCRIPTION OF THE PREFERRED EMBODIMENTS

With reference to the accompanying drawings, the projection welding method in accordance with this invention will be described.

Figure 1:
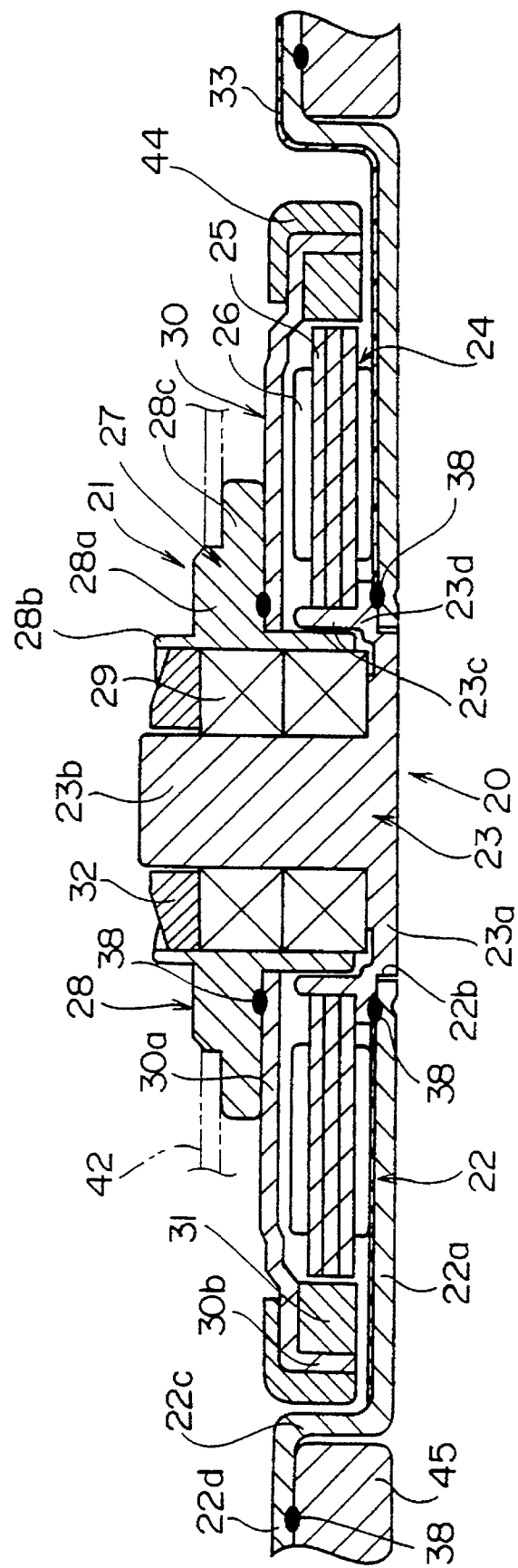
FIG. 1 is a sectional view showing a spindle motor produced by using a first example of the projection welding method in accordance with the present invention.

In FIG. 1, the depicted spindle motor is comprised of a stationary member 20 having a bracket 22 and a rotating member 21 having a rotor hub 27. The bracket 22 has a bracket main body 22a in the form of a circular plate, and a circular hole 22b is formed in the center portion of the bracket main body 22a. Furthermore, an outer circumferential wall portion 22c is provided upwardly of the outer peripheral edge portion of the bracket main body 22a, and a flange 22d projecting radially outwardly is provided on the upper end of the outer peripheral wall portion 22c. As shown in the drawings, the bracket main body 22a is nearly plate-shaped, and can be formed by, for example, press working an iron-type flat plate.

The bracket 22 has a shaft 23 to be fixed to the bracket main body 22a. The shaft 23 is provided with a circular base wall 23a and a shaft portion 23b projecting substantially perpendicularly upwardly from the center portion of the base portion wall 23a. Furthermore, outwardly of the shaft 23b, an annular projecting portion 23c is disposed, and this annular projecting portion 23c projects upwardly from the outer peripheral edge portion 23d of the base portion wall 23a. This outer peripheral edge portion 23d projects radially outwardly from the upper portion of the base portion wall 23a. This shaft 23 can be formed by cutting operation of, for example, an iron-type material.

A stator 24 is mounted on the bracket 22. The stator 24 has a stator core 25, and the stator core 25 is mounted on the outer peripheral surface of the annular projecting portion 23c. Its under surface abuts with the outer peripheral edge 23d of the shaft 23. A stator coil 26 is wound in a required manner on the stator core 25.

The rotor hub 27 has a hub portion 28 and a rotor portion 30. The hub portion 28 has an annular base portion 28a, a hollow cylindrical portion 28b provided projectingly vertically in the inner peripheral portion of the base portion 28a, and a flange 28c provided on the outer peripheral surface of the base portion 28a. In this rotor hub 27, the hollow cylindrical portion 28b is rotatably supported by the shaft 23 via a pair of bearings 29 (constituting bearing means). A rotor portion 30 is disposed on the under side of the hub portion 28, and its inner peripheral edge portion is fixed to the hub portion 28. The rotor portion 30 has a rotor main body 30a extending radially outwardly and a suspending wall 30b which is suspended downwardly from the outer peripheral edge portion of the rotor main body 30a, and a rotor magnet 31 is secured to the inner peripheral surface of the suspending wall 30h. The rotor magnet 31 is positioned in opposition to the stator A dust-proof cap 32 is disposed outwardly of the upper bearing 29. This dust-proof cap 32 prevents fine particles of grease in the bearing 29 from flowing out to an outside portion (the disk chamber in which the recording disk is accommodated). A labyrinth means is disposed outwardly of the lower bearing 29. In the specific example, the labyrinth means is constructed of a hollow cylindrical portion 28b provided in the hub portion 28 and an annular projecting portion 23c provided in the shaft 23, and in the same way as the dust-proof cap 32, prevents fine particles of grease from flowing out to the outside portion In the above-mentioned spindle motor, as shown in FIG. 1 by the alternate long and two short dash lines, a recording disk such as a magnetic disk is placed one the flange 28c of the hub portion 28, and by securing a clamp member (not shown) to the hub portion 28, the recording disk is interposed between the aforesaid clamp member and the flange 38c. Furthermore, a flexible circuit substrate 33 is disposed on the inner surface of the bracket 22, and the stator coil 26 is electrically connected to the circuit substrate 33. The circuit substrate 33 extends along the bracket main body 22a, the outer peripheral wall portion 22c, and the flange 22d, and is electrically connected to a power supply (not shown) in the outer portion. Hence, when an electric current is supplied to the stator coil 26 through the flexible circuit substrate 33, the rotating member 21 (rotor hub 27 and a recording disk 42) is rotated and driven in a predetermined direction with respect to the stationary member 20 (bracket 22).

Furthermore, an electromagnetic shield member 44 is mounted on a rotor portion 30. This shield member 44 is disposed in the corner portions of the rotor main body 30a and the suspending wall 30b of the rotor portion 30 so as to cover the outside of the rotor magnet 31, and prevents leakage of a magnetic force from the rotor magnet 31 to the outside portion.

The spindle motor thus described is mounted on a base member 45 of the disk driving apparatus. The base member 45 cooperates with a cover member (not shown) to define a disk chamber, and the spindle motor and the recording disk 42 mounted on it are accommodated in the disk chamber. A circular opening is formed in the base member 45, and by placing the flange 22d of the spindle motor on the base member 45, the bracket main body 22a and the outer peripheral wall portion 22c in the bracket 22 are positioned in the aforesaid opening. The flange 22d of the bracket 22 and the base member 45 are fixed firmly to each ohter in the manner to be mentioned.

Next, the manner of fixing the bracket main body 22a of the bracket 22 and the shaft 23 will be illustrated.

Figure 2:
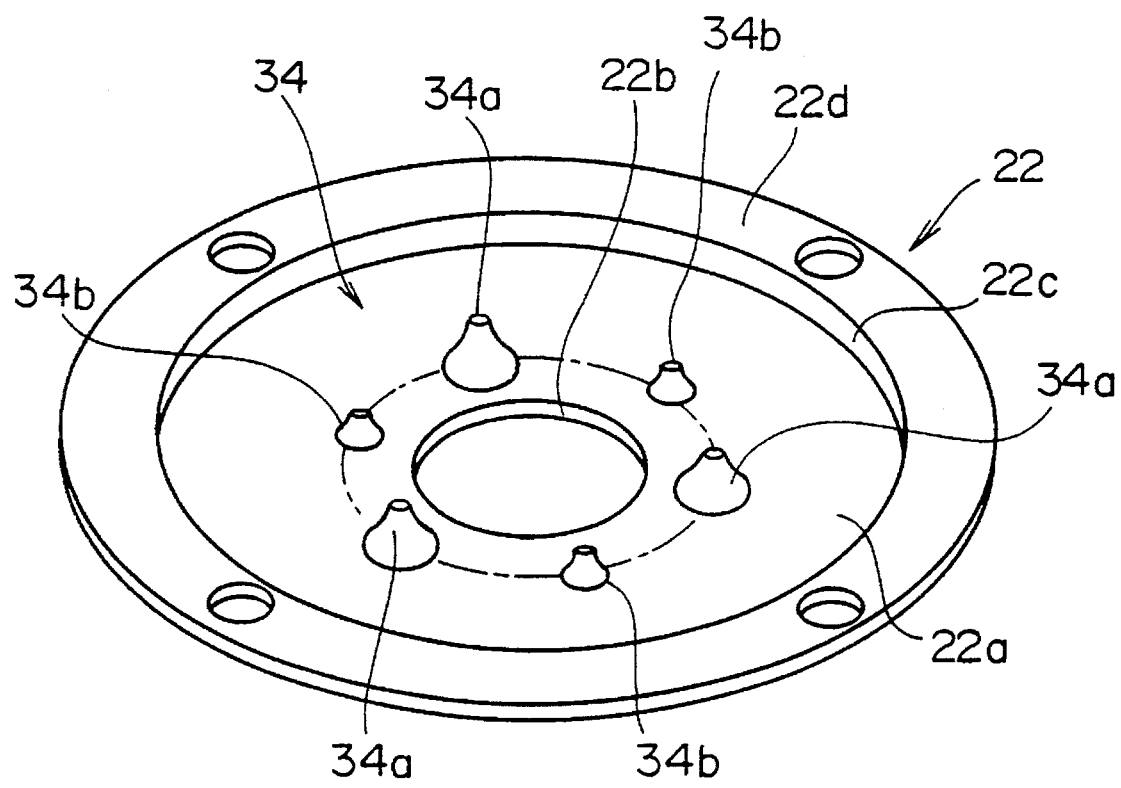
FIG. 2 is a perspective view showing the bracket main body in the spindle motor in FIG. 1.

FIG. 2 is a perspective view showing the bracket 22 of the spindle motor of FIG. 1. In this specific example, six circumferentially spaced projections 34 are provided on the upper surface (inner surface) of the bracket 22a. Three projections are composed of relatively large projections 34a, and the remaining three projections are composed of relatively small projections 34b. The projections 34 are disposed at substantially equal distances on the inner peripheral edge portion of the bracket main body 22a, and the large projections 34a and the small projections 34b are disposed alternately. The sizes of the large projections 34a and the small projections 34b differ depending upon the material and thickness of the bracket 22. For example, the large projections 34a can be formed in a hemispherical shape having a diameter of about 0.2 mm and a height of about 0.1 mm. The small projections 34b may be formed in a hemispherical shape having a diameter of about 0.1 mm and a height of about 0.05 mm. These projections may be formed simultaneously when the bracket 22 is press-worked.

In this spicific example, six projections 34 are formed, but at least three projections may be formed. In the specific example, large projections and small projections are formed each in groups of three. The ratio between the large projections 34a and the small projections 34b may be properly changed. Furthermore, in the specific example, two types of projections as the large projections 34a and the small projections 34b are used. But at least three types of projections may also be provided. Furthermore, in the specific example, the large projections 34a and the small projections 34b are arranged so as to position them on the same circumference, but it is possible to arrange the large projections 34a and the small projections 34b separately on concentric circles having different diameters.

Welding of the bracket main body 22a (first member) and the shaft 23 (second member) may be carried out in the following manner. First, as shown in FIG. 3A, the shaft 23 is turned upside-down and placed on a fixed electrode 35. The fixed electrode 35 has an annular base portion 35b provided with a hole 35a through which the shaft portion 23b is inserted in the center, and a ring-like electrode portion 35c projecting upwardly from the outer peripheral edge of the annular base portion 35b. A supporting jig 50 is disposed in outwardly of the fixed electrode 35. The supporting jig 50 has a supported portion 50a to be supported by a main body of a welding apparatus, and a position determining portion 50b having a nearly L-shaped section extending to the outer peripheral side of the base portion 35b of the fixed electrode 35.

When the shaft 23 is placed on the fixed electrode 35, the outer peirpheral edge portion 23d of the shaft 23 is position on the upper surface of the ring-like electrode portion 35c. Furthermore, the outer peripheral surface of the annular wall portion 23c in the shaft 23 is positioned so as to contact the inner peripheral surface of the ring-like electrode portion 35c, whereby the shaft 23 is position at a predetermined position with respect to the fixed electrode 35.

Next, as shown in FIG. 3B, the bracket main body 22a is placed on the shaft 23 so that the circular hole 22d of the btacket 22 is fitted on the outer periphery of the base portion wall 23a of the shaft 23. When such placement is performed, the inner peripheral portion of the bracket main body 22a is positioned on the outer peripheral edge portion 23d of the shaft 23, and the inner surface of the bracket main body 22a and the lower surface of the outer peripheral edge portion 23d in the shaft 23 are opposed to each other axially (vertical direction in FIG. 1 and FIGS. 2A to 2C). At this time, the flange 22d of the bracket main body 22a is positioned so that its outer peripheral surface contacts the inner peripheral surface of the position-determining bracket 50a of the supporting jig 50. By this construction, the bracket main body 22a is positioned in a predetermined positional relationship with respect to the shaft 23. A supporting stepped portion or a supporting projection may be provided on the inner peripheral surface of the position-determining bracket 50b, and the flange 22d of the bracket main body 22a be may supported by the supporting stepped portion or the supporting projection.

When the bracket main body 22a is placed in the above-mentioned manner, an annular space S is formed between the inner peripheral surface of the circular hole 22b of the bracket 22a and the outer peripheral surface of the base portion wall 23a of the shaft 23, as shown in FIG. 3B. This space S may be about 0.03 mm, and prevents the dispersion of a welding current between the two members at the time of welding the bracket main body 22a and the shaft 23. Instead of providing this space S, it is also possible to interpose an insulative ring, coating, etc.

Thereafter, as shown in FIG. 3C, an upper movable electrode 36 is descended, and its forward end portion is contacted with pressure against the inner peripheral portion of the bracket main body 22a. In such a condition, projections 34 projecting toward the outer peripheral edge portion 23d of the shaft 23 are provided in the inner peripheral portion of the braket main body 22a. Accordingly, the bracket main body 22a and the shaft 23 contact at the projections 34, in the specific example at the large projections 34a only, and in other parts, electric insulation in the axial derection between both is ensured.

When the fixed electorde 35 and the movable electrode 36 are set in this manner, a current is supplied in a condition in which a pressure is exerted between the two electrodes 35 and 36. In the specific example, the pressure applied between the movable electrode 36 and the fixed electrode 35 is adjusted to about 44 kgf/cm$^2$. The supply of direct current between the electrodes 35 and 36 consists of a first step of supplying a current of about 3,000 A for 0.001 to 0.003 seconds and a second step of supplying a current of about 4,000 A for 0.02 to 0.05 seconds. In the first step, a welding current substantially flows in three large projections 34a, and until the small projections 34b contact the shaft 23, the large projections 34a are melted. In the subsequent second step, a welding current flows in the large projections 34a and the small projections 34b whereby the large projections 34a and the small projections 34b are completely melted. Thus, a molten nugget 38 is formed between the bracket main body 22a and the shaft 23, and both members are surely fixed by projection welding (FIG. 3D).

In the specific example, the welding projections 34 are provided in the bracket main body 22a because they are easy to produce. But instead of this, they may be provided in the shaft 23, or both in the bracket main body 22a and the shaft 23d.

In the illustrated specific example, the projection welding method of this invention has been described by applying it to the welding of the bracket main body 22a and the shaft 23 of the spindle motor, but it is not limited to this example. It may be applied to the welding of the bracket 22 and a base portion 45 of the disk driving apparatus. In this case, as can be understood from FIG. 1, projections may be provided in any one of surfaces opposed to the bracket 22 and the base member 45 in the axial direction (vertically in the drawing). Furthermore, the projection welding method of this invention may be applied in the same way to the welding of the hub portion 28 and the rotor portion 30 in the rotor hub 27 of the spindle motor. In such a case, projections may be provided in any one of surfaces opposed axially to the hub portion 28 and the rotor portion 30.

Figure 4:
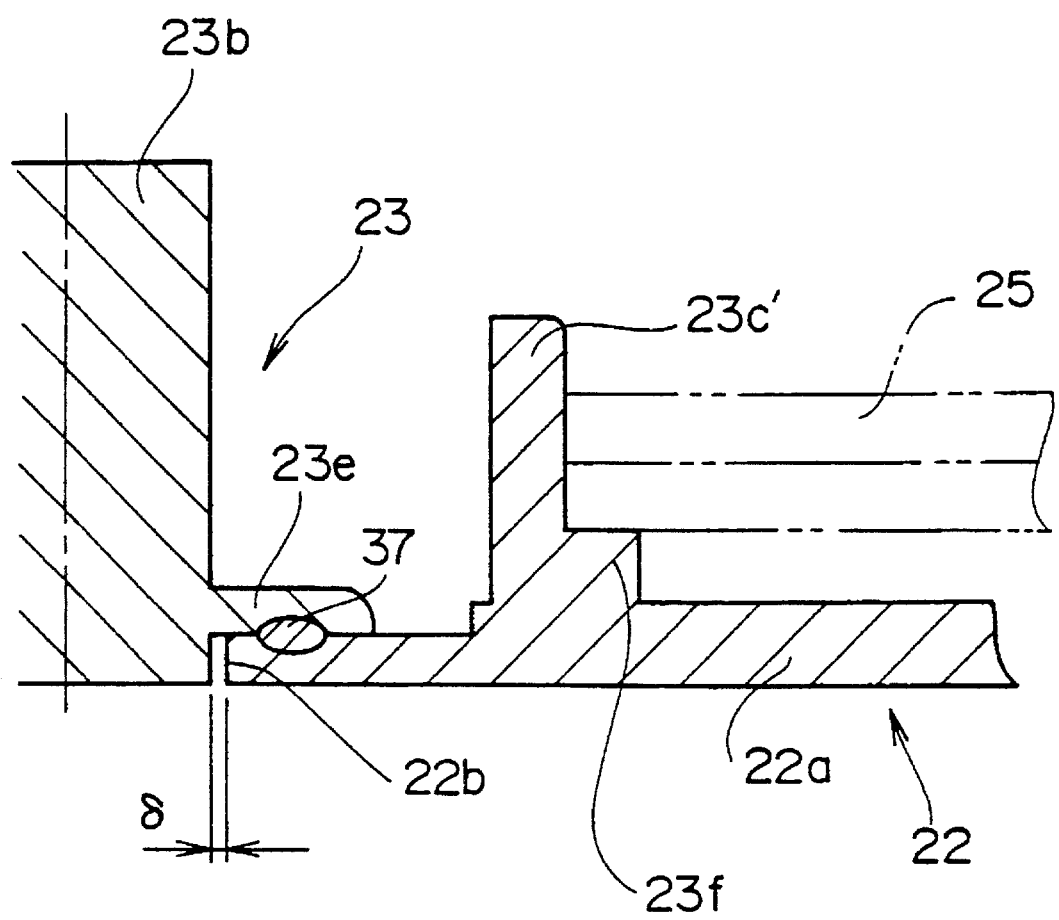
FIG. 4 is a sectional view showing a part of the modification of the bracket.

FIG. 4 shows a modified example of the bracket. Referring to FIG. 4, this modified example shows that an annular projecting portion 23c' on which the stator core 25 is mounted is provided in the bracket main body 22a. Namely, a substantially perpendicularly upwardly extending annular projecting portion 23c' is integrally provided in the inner peripheral portion of the bracket main body 22a, and an abutting stepped portion 23f is provided in the outer periphery of the lower portion of the annular projecting portion 23c' Accordingly, the stator core 25, as shown by an alternate long and two short dashes line, is mounted on the outer peripheral surface of the annular projecting portion 23c' and its lower surface abuts with the abutting stepped portion 23f. On the other hand, the shaft portion 23 is provided with the shaft portion 23b, and a welding flange 23e extending radially outwardly is integrally provided in its lower end portion.

The inner peripheral portion (a portion which projects radially inwardly from the annular projecting portion 23c') of the bracket main body 22a and the welding flange 23e of the shaft 23 are overlapped in an axial direction (vertically in FIG. 4), and the inner peripheral portion and the welding flange 23e are subjected to projection welding in the same way as mentioned above. Projections for welding are provided on the inner surface (a surface opposed to the welding flange 23e axially) in the same way as in the above-mentioned specific example.

In this modified example, the bracket main body 22a and the shaft 23 can be firmly welded to each other by using the aforementioned projection welding method.

Figure 5:
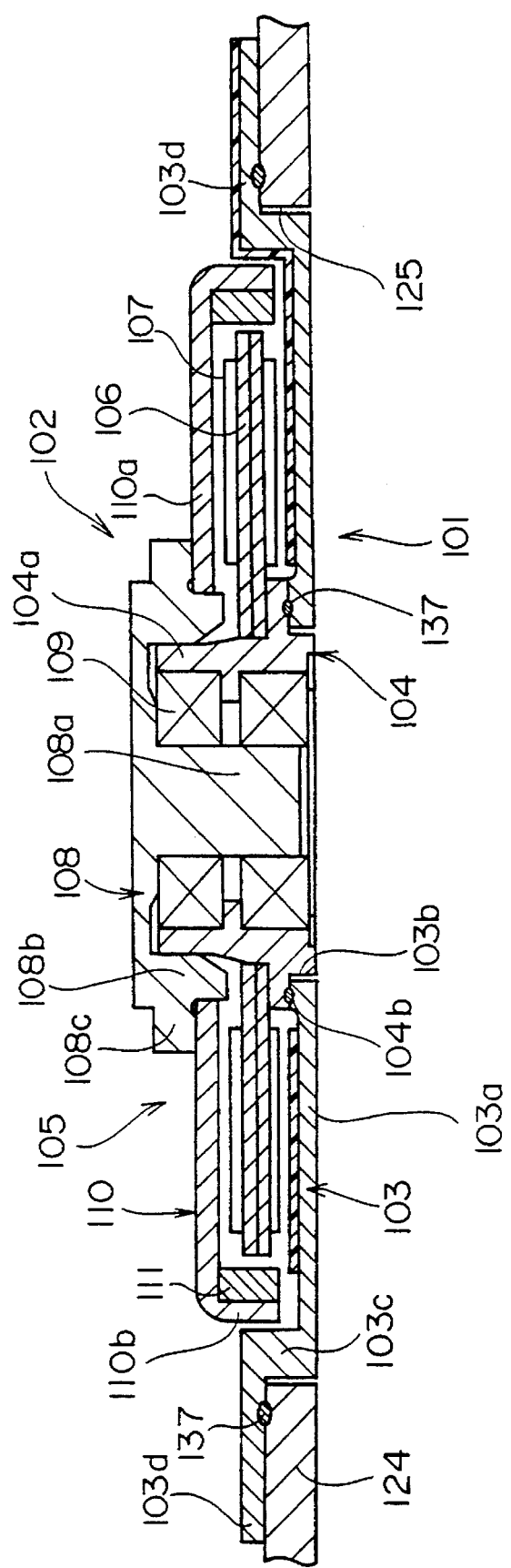
FIG. 5 is a sectional view showing a modified example of a spindle motor.

The above-mentioned projection welding method can be equally applied to a shaft-rotating type motor. In FIG. 5, the illustrated spindle motor is provided with a stationary member 101 fixed to a rotating member 102 rotatable relatively with respect to the stationary member 101. The stationary member 101 has a bracket log, and the racket 103 is composed of a bracket main body 103a and an annular supporting member 104. A circular hole 103b is formed in the central portion of the bracket main body 103a. Furthermore, an outwardly projecting outer peripheral wall portion 103b is provided in the outer peripheral portion of the bracket main body 103a. A radially outwardly extending flange 103d is provided at the upper end of the outer peripheral portion 103c. Furthermore, the annular supporting member 104 has a cylindrical wall 104a, and a radially outwardly projecting supporting flange 104b is provided on the outer peripheral surface of the lower end portion of the cylindrical wall 104a. The bracket main body 103a and the annular supporting member 104 are fixed by welding as mentioned below.

A stator core 106 is mounted on the outer peripheral surface of the annular supporting member 104, and its under surface abuts with the supporting flange 104b of the annular supporting mamber 104. A stator coil 107 is wound in a required manner on the stator core 106.

The rotating member 102 has a rotor hub 105, and the rotor hub 105 is constructed of a hub portion 108 and a rotor portion 110. A radially outwardly projecting flange 108c is provided in the hub portion 108, and a recording disk (not shown) is placed on the upper surface of the flange 108c. Furthermore, a downwardly projecting securing portion 108b is provided in the lower end surface of the hub portion 108, and the rotor portion 110 is mounted on the outer peripheral surface of such a securing portion 108b. Furthermore, the shaft 108b is integrally provided on the hub portion 108. The shaft 108b is arranged inwardly of the cylindrical wall 104a, and supported rotatably on the annular supporting member 104 via as pair of bearings 109 (constituting a bearing means). The rotor portion 110 has a radially outwardly extending rotor main body 110a and a suspending wall 110b suspended from the outer peripheral end portion 110a of the rotor main body 110a, and a rotor magnet 111 is mounted on the inner peripheral surface of the suspending wall 110b. The constructions of the spindle motor and other members are the same as those shown in FIG. 1.

In such a motor, the bracket main body 103a and the annular supporting member 104 or the base member 124 and the bracket 103 are respectively fixed by projection welding in the same manner as mentioned above. Upwardly projecting hemispherical welding projections (namely, large projections and small projections) are provided on the upper surface of the inner peripheral portion of the bracket main body 103a (a surface opposed axially to the under surface of the supporting flange 104b).

At the time of welding, the bracket main body 103 and the annular supporting member 104 are kept electrically insulated excepting the welding projections. When a current is supplied while the bracket main body 103a and the supporting flange 104b of the annular supporting member 104 are interposed between a fixed electrode and a movable electrode (not shown), the large projections for welding are melted in a first step, and then in a second step, the large projections and the small projections are melted. These two types of projections are melted to form a molten nugget 137, and the two members are firmly fixed by projection welding.

Such a method of projection welding can be equally applied to the welding of the bracket and the base member of the disk driving apparatus in a shaft-rotating type spindle motor, and/or to the welding of the hub portion and the rotor portion in the rotor hub in a shaft-rotating type spindle motor.

For example, when a bracket main body 222 and a shaft 223 in a spindle motor are fixed by projection welding, it is preferred to provide concave grooves so that the molten nugget will not be exposed to the outside.

Figure 6:
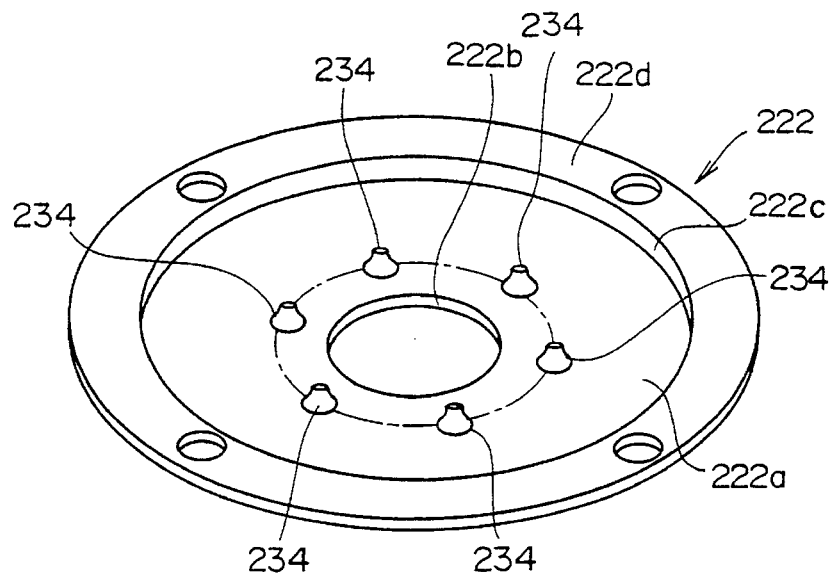
FIGS. 6 and 7 are perspective views showing a main portion of the bracket main body and the shaft in spindle motors to be produced by using a second example of the projection welding method in accordance with this invention.
Figure 7:
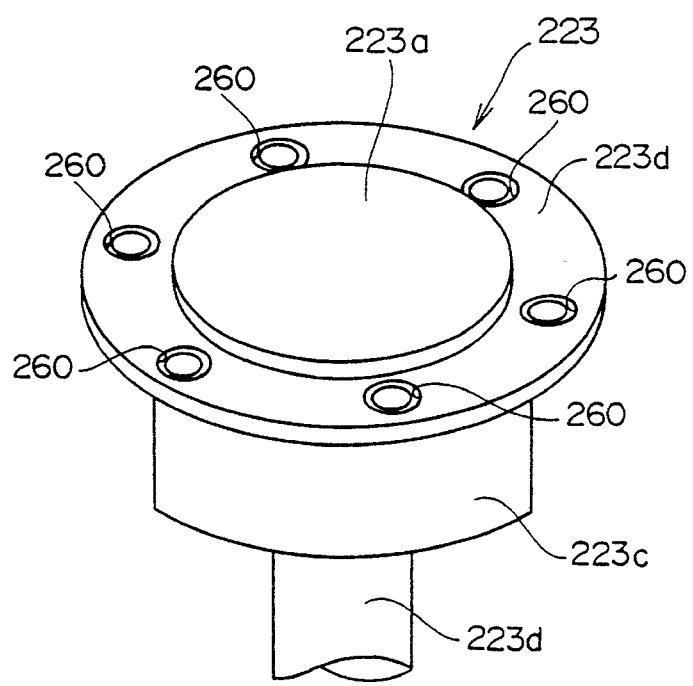

With reference to FIGS. 6 and 7, welding projections 234 are formed on the upper surface of the bracket 222. In the specific example, six substantially equal projections 234 are provided. The projections 234 do not need to be equal in size, and as shown in the specific example, two types of projections having different sizes may be provided.

Although the shape of the projections 234 differs depending upon conditions such as the material and thickness of the bracket 222, the projections 234 may be formed, for example, in a diameter of about 0.2 mm and a height of about 0.1 mm. These projections 234 exist on a concentric circle along the outer periphery of a circular hole 222b and are formed at equiangular spaces in a peripheral direction. They are formed simultaneously when the bracket 222 is press-worked.

On the other hand, ring-like concave grooves 260 are formed in the under surface of the outer peripheral edge portion 223d of the shaft 223 to correspond to each of the projections 234 provided in the bracket 222. The concave grooves 260 are formed in a ring-like shape having a larger diameter than the diameter of each projection 234 so that it will be positioned outwardly of a welded portion of the projections 234 and the outer peripheral edge portion 223d, and positioned at peripherally separated distances on a concentric circle along the outer periphery of a base portion wall 223a.

The concave grooves 260 are formed in a ring-like shape in this specific example but may be formed in a shape obtained by interrupting the ring. The width and depth of the concave groove 260 may be prescribed corresponding to the volume of the projection 234. The other structures of this motor are substantially the same as those shown in FIG. 1.

In performing the projection welding, first as shown in FIG. 8A, the shaft 223 is turned upside-down and placed on the fixed electrode 235. The fixed electrode 235 has an annular base portion 235b in which the shaft portion 223b is inserted centraly through a hole 235a, and a ring-like electrode portion 235c provided projectingly on the upper end outer peripheral edge of the annular base portion 235b.

A supporting jig 250 which is the same as shown in FIG. 2A to FIG. 2D is disposed outwardly of the fixed electrode 235. This supporting jig 250 has a supporting portion 250a supported by the main body of the apparatus and a position-determining portion 250b having a nearly L-shaped section. The outer peripheral edge portion 223d of the shaft 223 is placed on the ring-like electrode portion 235c in the fixed electrode 235.

As shown in FIG. 8B, the bracket main body 222a is placed on the outer peripheral edge portion 223d of the shaft 223 so that the circular hole 222b may be fitted onto the outer periphery of the base portion wall 223a of the shaft 223. By this construction, each projection 234 abuts with a portion surrounded by the corresponding concave groove 260 formed in the outer peripheral edge portion 223d. At this time, the flange portion 222d of the bracket 222 is positioned so that its outer peripheral surface may abut with the inner peripheral surface of the position-determining portion 250b.

Next, as shown in FIG. 8C, the movable electrode 236 descends from the upper portion of the fixed electrode 235. The movable electrode 236 is annular and has a predetermined positional relationship with respect to the fixed electrode 235. When the setting of the fixed and movable electrodes 235 and 236 is over, a predetermined DC current is supplied while a predetermined pressure is added between the electrodes 235 and 236, and projection welding is carried out.

When the projection welding is carried out in this way, the DC current supplied to the electrodes; 235 and 236 is concentrated onto the projections 234, and with a short period of time, the projections 234 and a part of the shaft 223 with which the projections contact are melted, whereby the a molten nugget 238 is formed between the bracket 222 and the outer peripheral edge portion 223d of the shaft 223 to fix the both members firmly (FIG. 8D).

In the method of welding in this specific example, concave grooves 260 are formed in the outer peripheral edge portion 223d of the shaft 223 which corresponds to the projections 234 provided in the bracket 222. Accordingly, when the projections 234 and their peripheral portions are melted, the molten mass is accommodated in the concave grooves 260, and the flowing of the molten mass becomes non-uniform to prevent the right angle degree of the bracket 222 and the shaft 223 from decreasing.

The welding method with the provision of the concave grooves 260 can be applied to the welding of the base member of the disk driving apparatus and the bracket of the spindle motor and/or the welding of the hub portion and the rotor portion in the rotor hub of the spindle motor.

In the specific example, projections are formed in one of the members to be welded and the concave grooves are formed in the other of these members. But projections and concave grooves are not necessarily formed separately in the members to be welded, and projections and concave grooves may be formed in the same member. Furthermore, the projections and the concave grooves may be provided in both members.

Figure 9:
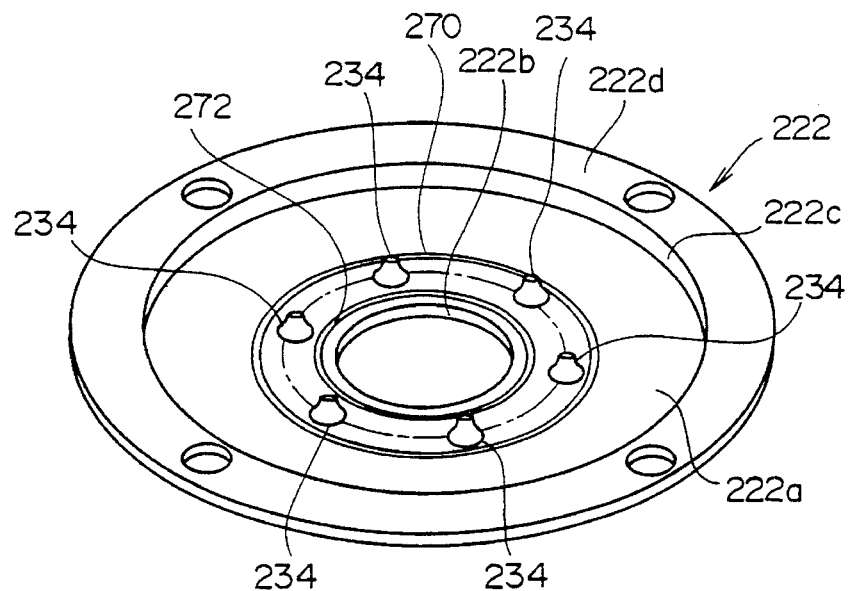
FIG. 9 is a perspective view showing another modified example of the bracket main body; and, FIG. 10 is a partial enlarged sectional view showing a main portion of the motor for explaining a third example of the manner of the projection welding method in accordance with this invention.

FIG. 9 shows a modified example of the bracket 222. In FIG. 9, projections 234 and concave grooves 270 and 272 are formed in the bracket 222. The concave grooves are composed of outward concave grooves 270 positioned outwardly of the projecions 234 and inward concave grooves 272 positioned inwardly of the projections 234. Furthermore, six projections 234 are provided on a concentric circle with respect to the circular hole 222b at peripheral distances.

The concave grooves 270 and 272 are formed on a concentric circle with respect to the circular hole 222b, and are interposed between both sides of the projections 234. The projections 234 and the concave grooves 270 and 272 so formed give the same operation and effect as in the above specific example. Incidentally, the concave grooves 270 and 272 are a peripheral portion of the individual projections 234 which can be shaped in a form partially bulged along the shape of the projections 234. The projections 234 and the concave grooves 270 and 272 may be molded at the same time as the press-working of the bracket 222.

In this modiifed example, the concave grooves 270 and 272 are respectively provided outwardly and inwardly of the projections 234, but the desired effect can be achieved by providing only the concave grooves 270 outwardly or the concave grooves 272 inwardly.

Figure 10:
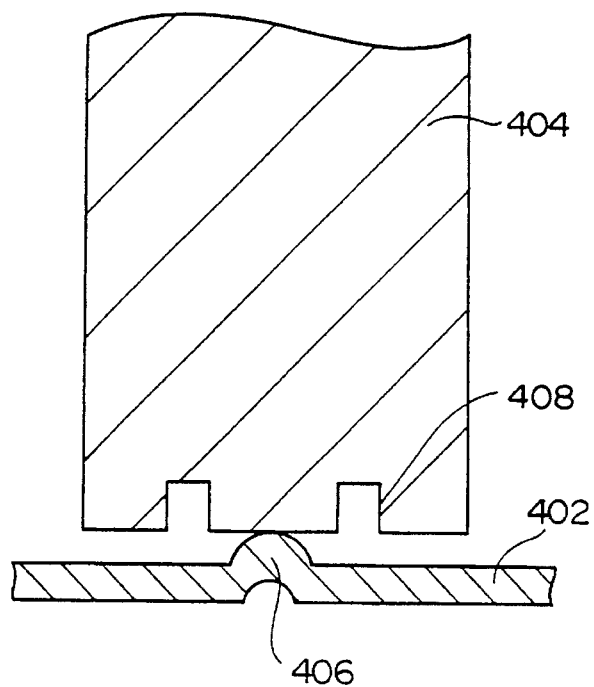

FIG. 10 shows a third specific example of the projection welding method in accordance with the present invention. This specific example applies to the fixing of a shaft (second member) 404 upstandingly to a flat plate (first member) 402 by welding. An annular concave groove 408 corresponding to a projection 406 is formed on a surface to be welded of the shaft 404.

In performing the welding of the plate 402 to the shaft 404, the projection 406 is caused to abut with a surface surrounded by the annular concave groove 408, and these members are interposed under pressure between the fixed and movable electrodes, followed by supplying a DC current between the electrodes. The supplying of the current results in melting of the projections 406 and the vicinity of a portion with which the projections 406 abut, to perform the welding of the plate 402 to the shaft 404.

At this time, the molten product flows in the concave grooves 408 and is prevented from flowing outwardly of the concave grooves 408. Accordingly, the degree of perpendicularity of the plate 402 and the shaft 404 is determined by a processing accuracy of a surface of the outward portion of the concave groove 408 and a surface which contacts the plate 402. If these contacting surfaces are finished in a high accuracy, the shaft 404 can be fixed to the plate 402 by welding at a high degree of perpendicularity.

The heat generated by welding in this case is concentrated on the vicinity of the projections 406, and effects to be exerted onto the outside of the concave grooves 408 decrease. Accordingly, from this fact, the degree of perpendicularity can be maintained at a high accuracy. The foregoing description shows that this welding method is effective in welding a rod-like member perpendicularly onto a flat plate material.

In this specific example, the concave grooves 408 are provided in the shaft 404, but these grooves 408 may be provided in the plate 402. In such a case, projections 406 and the concave grooves 408 may be formed simultaneously with press-working.

In the above-mentioned specific examples, the projection welding method in accordance with this invention has been explained with reference to the welding of parts relating to a spindle motor. But the projection welding method is not limited thereto, and may be employed with a wide variety of parts to be joined together.

What is claimed is:

1. In a projection welding method which comprises providing a plurality of projections on at least one of a first member and a second member to be welded to each other, supplying a current between the first member and the second member, melting the plurality of projections, and thereby welding the first member and the second member, wherein the plurality of projections are composed of first projections having a relatively large height and second projections having a relatively low height, and at the time of welding, the first projections are first melted, and then the second projections are melted.

2. A projection welding method of claim 1 wherein the first projections and second projections are alternately provided at intervals peripherally of the one member.

3. A projection welding method of claim 2 wherein six projections are provided at intervals peripherally of the one member, and three first projections and three second projections are alternately provided at intervals peripherally.

4. A projection welding method of claim 1 wherein the first projections are hemispherical and have a diameter of about 0.2 mm and a height of about 0.1 mm, and the second projections are hemispherical and have a diameter of about 0.1 mm and a height of about 0.05 mm.

5. A projection welding method of claim 1 wherein the first member is a bracket main body of a bracket mounted on a base member of a disk driving apparatus in the spindle motor and the second member is a shaft rotatably supporting a hub on which the recording disk is mounted, and the plurality of projections are provided in either one of axially opposed surfaces of the bracket main body and the shaft.

6. A projection welding method of claim 1 wherein the first member is a bracket main body in a bracket mounted on the base member of the disk driving apparatus, the second member is an annular supporting member rotatably supporting the shaft integrally with a hub mounted on the recording disk, and the plurality of projections are provided in one of axially opposed surfaces of the bracket main body and the annular supporting member.

7. A projection welding method of claim 1 wherein the first member is a hub portion mounted on the recording disk in the spindle motor, the second member is a rotor portion mounted on a rotor magnet in the hub, and the plurality of projections are provided in either one of axially opposed surfaces of the rotor portion and the rotor portion.

8. A projection welding method of claim 1 wherein the first member is a bracket in the spindle motor, the second member is a base member of the disk driving apparatus, and the plurality of projections are provided in either one of axially opposed surfaces of the bracket and the base member.

9. A projection welding method of claim 1 wherein the first member, the second member, or both have concave grooves into which the molten product of the plurality of projections flow.

10. A projection welding method of claim 9 wherein each of the concave grooves is provided adjacent each of the plurality of projections.

11. A projection welding method of claim 10 wherein the concave grooves are provided in the form of rings adjacent each portion in which the plurality of projections are melted.

12. A projection welding method of claim 9 wherein the concave grooves are provided radially outwardly and/or radially inwardly of portions in which the plurality of projections are provided.

13. A projection welding method of claim 12 wherein the plurality of projections are disposed at peripherally space-apart distances, and the concave grooves are provided in a ring shape radially outwardly and inwardly of the plurality of projections.

* * * * *